UNITED STATES PATENT OFFICE.

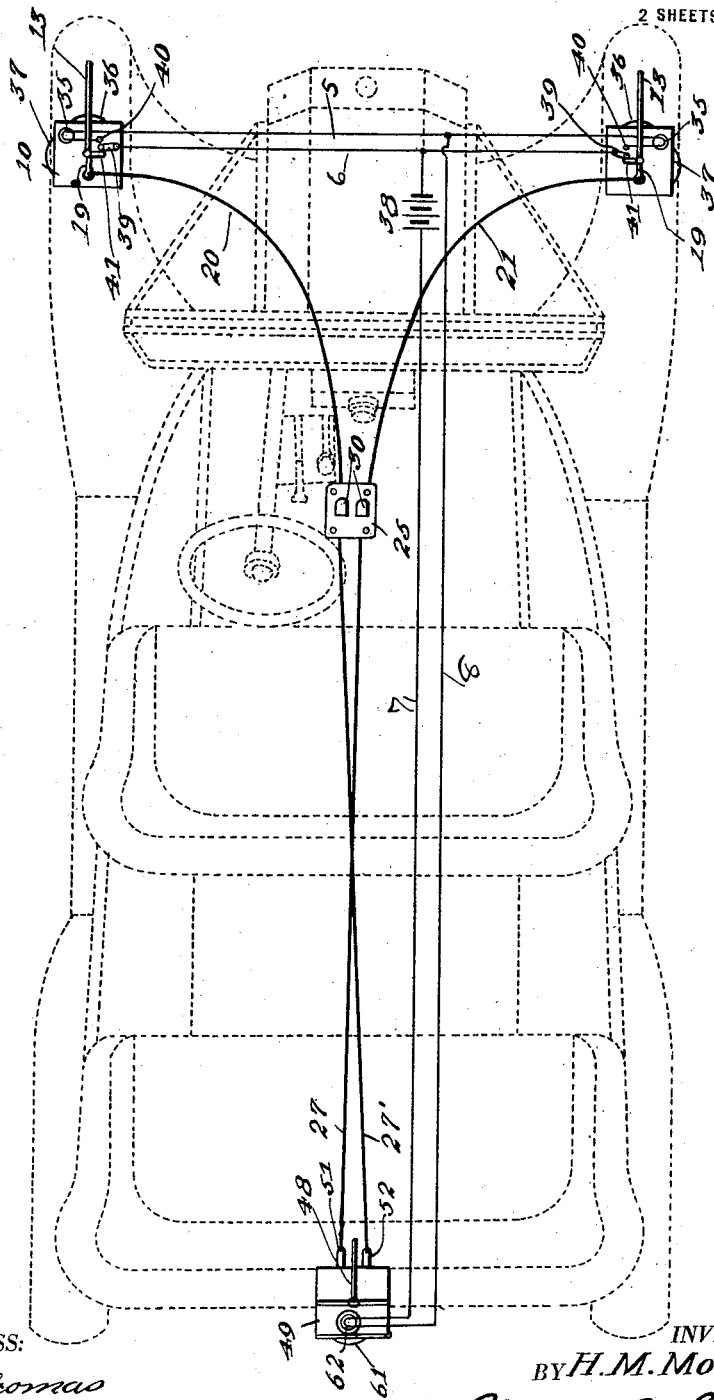

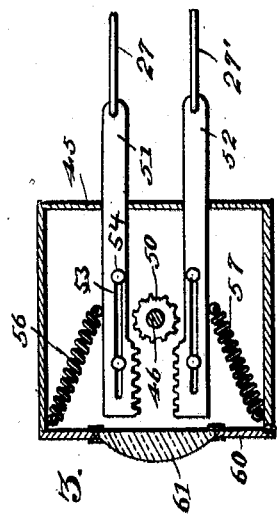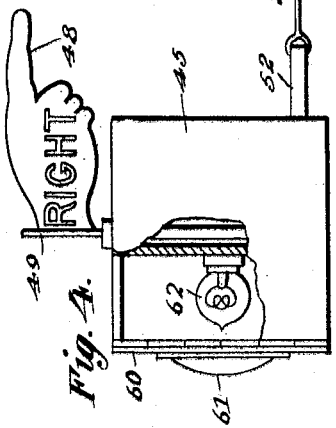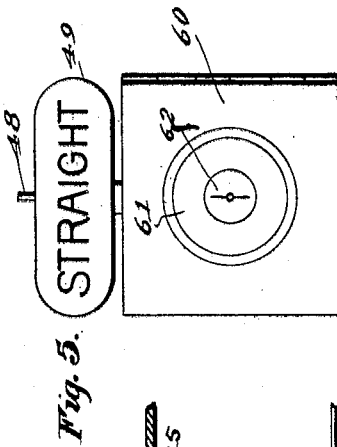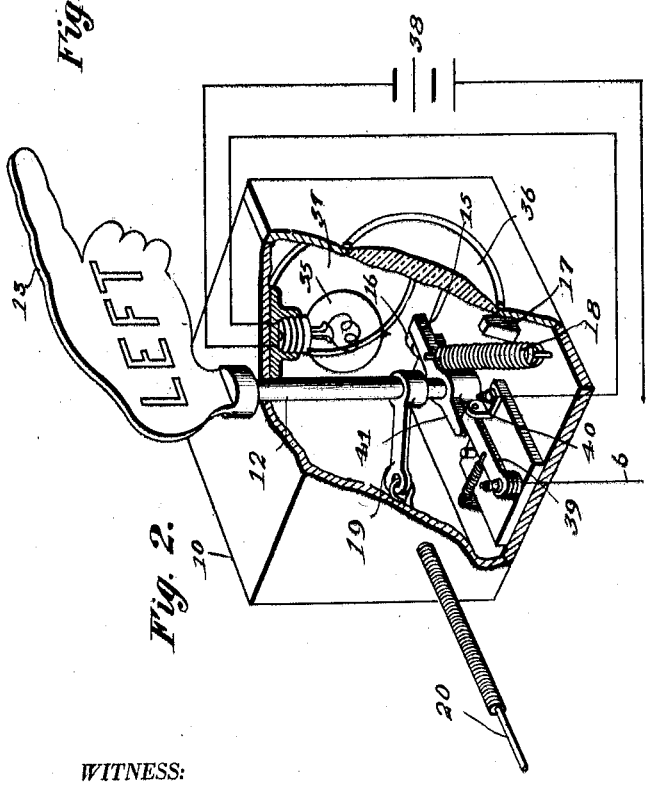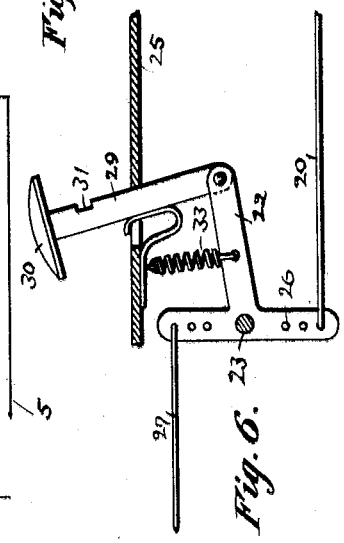

HARLEY M. MOFFETT, OF DESHLER, OHIO.

AUTOMOBILE DIRECTION SIGNAL.

1,408,377. Specification of Letters Patent. Patented Feb. 28, 1922.

Application filed June 24, 1919. Serial No. 306,305.

*To all whom it may concern:*

Be it known that I, HARLEY M. MOFFETT, a citizen of the United States, residing at Deshler, in the county of Henry and State of Ohio, have invented new and useful Improvements in Automobile Direction Signals, of which the following is a specification.

This invention relates to an automobile direction signal, and one object is to provide a plurality of indicating devices, certain of which are mounted at the front of the machine, with an additional indicating device at the rear of the machine, and means of novel construction for controlling all of said indicating devices.

A further object is to provide a plurality of indicating devices, with means for illuminating said devices or signals, and certain novel means for controlling all of the indicating devices and illuminated signals simultaneously.

With the foregoing and other objects in view, the invention consists in the construction, combination, and arrangement of elements hereinafter described and claimed.

In the drawings,

Figure 1 is a diagrammatic view, showing the position of the signals at the front and rear of a motor car, the latter being illustrated in dotted lines and in top plan, Figure 2 is a perspective view, with the casing broken away, illustrating one of the signals at the front of the car, Figure 3 is a horizontal section through the casing of the rear signal, Figure 4 is a side view of the rear signal, a portion of the casing being broken away, Figure 5 is a rear elevation of the signal last named, Figure 6 shows one of the pedals for operating the signals.

In carrying out my invention I mount two of the signals or indicating devices at the front of the machine and preferably on the front wheel fenders, and also mount an indicating device or signal at the rear of the machine, near the central portion of the body thereof, or on one of the rear wheel fenders. If desired, signals may be mounted on both of the rear wheel fenders.

Referring first to the signals at the front of the car, 10 indicates a casing mounted in any suitable manner on the wheel fender, or in other convenient position. Mounted within the casing is a rotatable standard or shaft shown at 12 and serving to mount the signal or hand member 13, above the casing proper. The signal mounted on the right side of the car will carry the designation Right on one side thereof, and the signal on the left will carry the word Left on one side.

The shaft 12 carries near the lower end thereof a laterally extending arm 15 engaging an upright 16 for limiting the movement of the shaft in one direction, and therefore limiting the movement of the signal carried by the upper end thereof. A similar element 17 limits the movement of the shaft in the other direction when engaged by the arm 15. A spring 18 serves to restore the signal to normal position when operated. Shaft 12 also carries an arm 19 having connection with a flexible element 20, constituting a cable or flexible shaft. Cable 20 extends to one end or arm of a T-shaped lever 22 pivoted at 23, the lever being provided with a plurality of series of apertures 26, permitting of the connection of cable 20 and of cable 27, mentioned below, at the required point or points for producing the leverage desired.

Two operating or controlling pedals 30 are provided as shown in Figure 1. Plate 25 is mounted within the car body and adjacent to the operator's seat. The plate is slotted in two places, and the element 29 of each pedal projects through one of the slots and is provided with notch 31 for engaging the edge of the slot, under the action of spring 32. Spring 33 normally retains lever 22 and the pedal in inoperative position.

In order to provide a signal visible at night, I employ electric lamps 35, a lens 36 being positioned in the front of each lamp casing, and a lens 37 on the outside of the casing, the lenses being preferably red. The lamp circuit includes wires 5, 6, 7, 8, and battery 38. The circuit also includes (in each casing 10) contact 40 and switch 39, with which arm 41 on shaft 12 cooperates, the arm being so located that the circuit is closed when the mechanical signal is thrown to operative position.

The rear signal is mounted within casing 45 and a rotary standard or shaft 46 carries near its upper end an indicating device or hand 48, and an upper indicating device 49. The hand 48 carries designations Right and Left on opposite sides thereof, and when in central or neutral position neither word indicating direction is visible from a point immediately in the rear, but the upper signal 49 is visible and indicates that the car will proceed straight ahead. Hand 46 is returned to normal position after operation by means of spring 47.

A gear wheel 50 is mounted on shaft 46 and is engaged by rack bars 51 and 52, located as shown, and adapted to engage the gear wheel on opposite sides thereof, for rotating the wheel and shaft in either direction. These rack bars are slotted longitudinally as shown at 53, the slots cooperating with engaging devices or guides 54. A spring 56, or 57 as the case may be, returns the bar with which it is connected to normal position. Each rack bar has connection with a cable, one of the cables being cable 27 referred to above and having connection with one of the T-shaped levers 22 controlled by one of the pedals 30. The other rack bar has connection with cable 27' under the control of the other pedal 30 and its T-shaped lever.

The casing 45 is provided with a rear door 60 having mounted therein a green lens 61. Electric lamp 62 is mounted in the position shown and receives current from a circuit including wires 7, 8. A diagrammatic view of the circuits is shown in Fig. 1, and the rear lamps are lighted when either of the front signal lamps is lighted.

It will therefore be observed that the rear signal is mechanically and electrically under the control of either one of the front signals.

What is claimed is—

1. In a system of automobile direction signals, a plurality of indicating devices independently controlled, located at the front of the vehicle and on either side thereof, a signal positioned at the rear of the vehicle, and means for controlling the rear signal when either of the front signals is operated, said means including a pair of T-shaped levers, corresponding ends of the levers being connected respectively with the front indicating devices, and oppositely located portions of the levers being connected with the rear signal, and a pedal connected with one element of each T lever.

2. In a system of automobile direction signals, a plurality of indicating devices located at the front of the vehicle and on either side thereof, an indicating device at the rear of the vehicle, and including a shaft and a gear wheel thereon, reciprocable rack bars for engaging the gear wheel on opposite sides, and means controlling each rack bar and one of the signals at the front of the vehicle.

In testimony whereof I affix my signature.

HARLEY M. MOFFETT.